US010636552B2

(12) United States Patent
Ham et al.

(10) Patent No.: US 10,636,552 B2
(45) Date of Patent: Apr. 28, 2020

(54) MULTI-FUNCTION ELECTRONIC DEVICE HAVING MEMRISTOR AND MEMCAPACITOR AND METHOD FOR MANUFACTURING THE SAME

(71) Applicant: GWANGJU INSTITUTE OF SCIENCE AND TECHNOLOGY, Gwangju (KR)

(72) Inventors: Moon Ho Ham, Gwangju (KR); Myung Woo Son, Gwangju (KR); Yun Bin Jeong, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 15/926,517

(22) Filed: Mar. 20, 2018

(65) Prior Publication Data

US 2018/0268970 A1    Sep. 20, 2018

(30) Foreign Application Priority Data

Mar. 20, 2017    (KR) .................... 10-2017-0034621
Feb. 14, 2018    (KR) .................... 10-2018-0018225

(51) Int. Cl.
| | | |
|---|---|---|
| *H01C 7/108* | (2006.01) | |
| *H01G 7/06* | (2006.01) | |
| *H01G 4/40* | (2006.01) | |
| *H01G 2/00* | (2006.01) | |
| *H01C 7/10* | (2006.01) | |

(52) U.S. Cl.
CPC ........... *H01C 7/108* (2013.01); *H01C 7/1006* (2013.01); *H01G 2/00* (2013.01); *H01G 4/40* (2013.01); *H01G 7/06* (2013.01)

(58) Field of Classification Search
CPC ............. H01C 7/108; H01G 2/00; H01G 7/06
See application file for complete search history.

(56) References Cited

U.S. PATENT DOCUMENTS

| | | | | |
|---|---|---|---|---|
| 8,466,461 | B2 * | 6/2013 | Seo ..................... | H01L 27/2436 257/3 |
| 9,224,821 | B2 * | 12/2015 | Zhang .................... | H01L 29/48 |

(Continued)

FOREIGN PATENT DOCUMENTS

| | | |
|---|---|---|
| KR | 20130021864 A | 3/2013 |
| KR | 10-1474088 B1 | 12/2014 |

OTHER PUBLICATIONS

G.H. Shin et al., "Multilevel Resistive Switching Nonvolatile Memory Based on MoS2 Nanosheet-embedded Graphene Oxide", 2D Materials, IOP Science, Aug. 1, 2016, vol. 3, No. 3. (10 pages).

(Continued)

*Primary Examiner* — Kyung S Lee
(74) *Attorney, Agent, or Firm* — Buchanan Ingersoll & Rooney PC

(57) ABSTRACT

The present invention relates to a multi-function electronic device having a memristor and a memcapacitor and a method for manufacturing the same. The multi-function electronic device having a memristor and a memcapacitor has a laminated structure of a first insulating layer comprising an organic material/an active layer/a second insulating layer comprising an organic material, and thus has a resistance and capacitance varying with the applied voltage.

3 Claims, 6 Drawing Sheets

(56) References Cited

U.S. PATENT DOCUMENTS

| | | | | |
|---|---|---|---|---|
| 9,269,901 B2* | 2/2016 | Hwang | ................. | H01L 45/145 |
| 2009/0257267 A1* | 10/2009 | Scheuerlein | ........ | G11C 11/5678 |
| | | | | 365/148 |
| 2011/0199815 A1 | 8/2011 | Meade et al. | | |
| 2014/0268994 A1* | 9/2014 | Rose | ................. | G11C 13/0059 |
| | | | | 365/148 |
| 2014/0374960 A1* | 12/2014 | Cojocaru | .............. | C01B 32/184 |
| | | | | 264/430 |
| 2015/0318474 A1* | 11/2015 | Hwang | .............. | G11C 13/0002 |
| | | | | 438/382 |
| 2015/0371848 A1* | 12/2015 | Zaretski | ............ | H01L 21/02527 |
| | | | | 438/496 |
| 2016/0017077 A1* | 1/2016 | Lee | ........................ | C08L 65/00 |
| | | | | 526/256 |
| 2018/0033864 A1* | 2/2018 | Cao | ................... | H01L 29/66568 |

OTHER PUBLICATIONS

A. A. Bessonov et al., "Layered Memristive and Memcapacitive Switches for Printable Electronics", Nature Materials, Nov. 10, 2014, pp. 1-6, vol. 14.

Office Action (Notification of Reason for Refusal) dated Mar. 25, 2019, by the Korean Patent Office in corresponding Korean Patent Application No. 10-2018-0018225, and an English Translation of the Office Action. (8 pages).

\* cited by examiner

Initial state $V < V_{set}$ $V \geq V_{set}$

MULTI-FUNCTION ELECTRONIC DEVICE HAVING MEMRISTOR AND MEMCAPACITOR AND METHOD FOR MANUFACTURING THE SAME

CROSS-REFERENCE TO RELATED APPLICATION

This application claims priority to and the benefit of Korean Patent Application No. 10-2017-0034621, filed on Mar. 20, 2017 and No. 10-2018-0018225, filed on Feb. 14, 2018, the disclosure of which is incorporated herein by reference in its entirety.

BACKGROUND OF THE INVENTION

Field of the Invention

The present invention relates to a multi-function electronic device having a memristor and a memcapacitor and a method for manufacturing the same, particularly to a multi-function electronic device implementing memristor and memcapacitor functions with a single material and a method for manufacturing the same.

Description of the Related Art

Future society will require a technology that can effectively store and process information due to the sharp increase in the amount of information. Therefore, there is a need for an alternative technology that allows to achieve a higher calculation efficiency than the binary operations implemented in existing silicon-based devices, store a large amount of information per unit area, and greatly reduce the energy required for information processing with a high operating speed.

An electronic circuit is represented by a combination of basic elements such as a resistor, a capacitor, and an inductor. In general, one material exhibits a single resistance or capacitance value. Thus, multiple basic elements are required to indicate various information.

Therefore, if a material is developed that allows to adjust resistance and capacitance step by step with voltage and to store resistance and capacitance values, it can greatly simplify electronic circuits and can also significantly reduce power consumption.

A memristor device, which is currently under active research, simultaneously implements the memory function of storing a resistance state and the switching function of modulating resistance with voltage, and thus can be applied to the field of neuromorphic and mem-computing.

A memcapacitor device, which has similar properties to the memristor device, simultaneously implements the switching function of modulating capacitance with voltage and the memory function of storing a capacitance state, and thus can be applied to the field of neuromorphic and mem-computing, where memristor devices can be applied. Besides, the memcapacitor device, whose capacitance can be modulated, can be applied to the gate dielectric of transistor devices, and thus to multi-valued logic devices.

CITATION LIST

Patent Literature

Patent Literature 1: Korean Patent No. 10-1474088

SUMMARY OF THE INVENTION

An object of the present invention is to provide a multi-function electronic device implementing memristor and memcapacitor functions with a single material, and a method for manufacturing the same.

Objects of the present invention are not limited to the object described above, and other objects that are not described will be clearly understood by a person skilled in the art from the description below.

In order to achieve the above objects, one aspect of the present invention provides a multi-function electronic device having a memristor and a memcapacitor. The multi-function electronic device having a memristor and a memcapacitor according to the present invention comprises a substrate, a first electrode disposed on the substrate, a first insulating layer disposed on the first electrode and which comprises an organic material, an active layer disposed on the first insulating layer, a second insulating layer disposed on the active layer and which comprises an organic material, and a second electrode disposed on the second insulating layer, wherein the active layer has a resistance and capacitance varying with the applied voltage.

Further, the first insulating layer and the second insulating layer each independently comprise a PMMA or PVA material.

Further, the active layer has an ultra-thin film structure.

Further, the active layer may comprise graphene, a metal oxide, a metal nitride, a metal sulfide, a metal selenide, or a metal telluride.

Further, the graphene may comprise monolayer graphene, bilayer graphene, multilayer graphene, or doped graphene.

The metal oxide may comprise CaO, CdO, $Co_3O_4$, $CoO_2$, $CuO_2$, $MoO_3$, $WO_3$, $Ga_2O_3$, $MnO_2$, $ZnO$, $RuO_2$, $TiO_2$, $SnO_2$, $Nb_2O_5$, $NiO$, $CrO_2$, $Fe_3O_4$, $ZrO_2$, $HfO_2$ or $V_2O_5$.

Further, the metal nitride may comprise $Ti_2N$, $Ti_3N_2$, $Ti_4N_3$, $Zr_2N$, $V_2N$ or $Cr_2N$.

Further, the metal sulfide may comprise $MoS_2$, $WS_2$, $ReS_2$, $NbS_2$, $ZrS_2$, $TiS_2$, $HfS_2$ or $VS_2$.

Further, the metal selenide may comprise $MoSe_2$, $WSe_2$, $ReSe_2$, $NbSe_2$, $ZrSe_2$, $TiSe_2$, $HfSe_2$ or $VSe_2$.

Further, the metal telluride may comprise $MoTe_2$, $WTe_2$, $ReTe_2$, $NbTe_2$, $ZrTe_2$, $TiTe_2$, $HfTe_2$ or $VTe_2$.

In order to achieve the above objects, another aspect of the present invention provides a method for manufacturing a multi-function electronic device having a memristor and a memcapacitor. The method for manufacturing a multi-function electronic device having a memristor and a memcapacitor according to the present invention comprises the steps of: sequentially forming an active layer and a second insulating layer comprising an organic material on a first base material; removing the first base material; sequentially forming a first electrode and a first insulating layer comprising an organic material on a substrate; transferring the active layer and the second insulating layer such that the active layer is disposed on the first insulating layer, and forming a second electrode on the second insulating layer, wherein the active layer has a resistance and capacitance varying with the applied voltage.

Further, the first insulating layer and the second insulating layer each may independently comprise a PMMA or PVA material.

Further, the active layer comprises a two-dimensional material.

Further, the active layer has an ultra-thin film structure.

Further, the active layer may comprise graphene, a metal oxide, a metal nitride, a metal sulfide, a metal selenide, or a metal telluride.

DETAILED DESCRIPTION OF THE PREFERRED EMBODIMENTS

Figure 1:
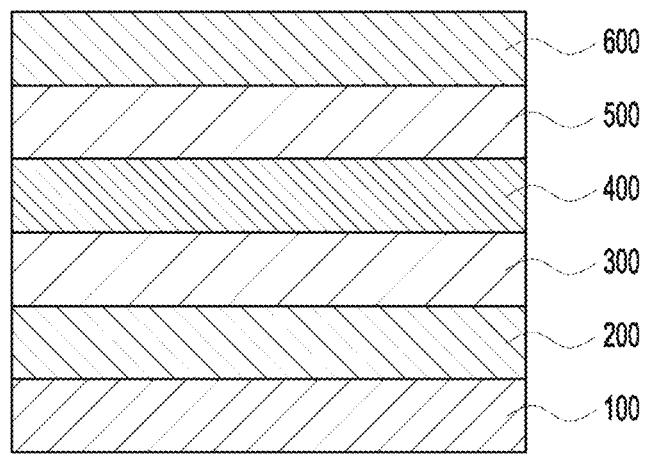
FIG. 1 is a cross-sectional view of a multi-function electronic device having a memristor and a memcapacitor according to one embodiment of the present invention.

Hereinafter, the present invention will be described with reference to the accompanying drawings. The present invention may, however, be embodied in many different forms and should not be construed as limited to the embodiments set forth herein. In order to clearly illustrate the present invention, parts not related to the description are omitted in the drawings, and like parts are denoted by like reference numerals throughout the specification.

Herein, when a part is described as being connected" or "coupled" to another part, it may be directly connected or coupled to another part or may be indirectly connected or coupled to another part with a member interposed therebetween. Further, the terms "comprise" and "include" as used herein refer to the presence of the corresponding component and is not intended to exclude additional components, unless otherwise specified.

The terms as used herein are for the purpose of describing particular embodiments only and are not intended to limit the invention. As used herein, the singular forms "a," "an" and "the" are intended to comprise the plural forms as well, unless the context clearly indicates otherwise. It is to be further understood that the terms "comprise," "include" and "have" as used herein specify the presence of stated features, numbers, steps, actions, components, parts, or a combination thereof, but do not preclude the presence or addition of one or more other features, numbers, steps, actions, components, parts, or a combination thereof.

The term "multilayer structure of A/B/C" as used herein refers to a structure in which a layer B and a layer C are sequentially disposed on a layer A.

Hereinafter, a multi-function electronic device having a memristor and a memcapacitor according to one embodiment of the present invention will be described.

FIG. 1 is a cross-sectional view of a multi-function electronic device having a memristor and a memcapacitor according to one embodiment of the present invention.

With reference to FIG. 1, a multi-function electronic device having a memristor and a memcapacitor according to one embodiment of the present invention may comprise a first electrode 200, a first insulating layer 300, an active layer 400, a second insulating layer 500, and a second electrode 600 that are sequentially laminated on a substrate 100.

The substrate 100 may be made of any material that can serve as a support substrate. For example, the substrate 100 may be a silicon (Si) substrate or a $Si/SiO_2$ substrate. On the other hand, the substrate may be omitted as occasion demands.

The first electrode 200 may be disposed on the substrate 100. The first electrode 200 may be made of any electrode material. For example, the first electrode 200 may be an Al electrode.

The first insulating layer 300 may be disposed on the first electrode 200. The first insulating layer 300 may be made of any insulator material. For example, the first insulating layer 300 may comprise an organic material. The organic material may comprise, for example, poly methyl methacrylate (PMMA) or poly vinyl pyrrolidone (PVP) as an insulator material.

The active layer 400 may be disposed on the first insulating layer 300. The active layer 400 may use a material having charge storage capability. For example, the active layer 400 may comprise graphene, a metal oxide, a metal nitride, a metal sulfide, a metal selenide, or a metal telluride.

For example, the graphene may comprise monolayer graphene, bilayer graphene, multilayer graphene, or doped graphene.

Further, the metal oxide may comprise, for example, CaO, CdO, $Co_3O_4$, $CoO_2$, $CuO_2$, $MoO_3$, $WO_3$, $Ga_2O_3$, $MnO_2$, ZnO, $RuO_2$, $TiO_2$, $SnO_2$, $Nb_2O_5$, NiO, $CrO_2$, $Fe_3O_4$, $ZrO_2$, $HfO_2$ or $V_2O_3$.

Further, the metal nitride may comprise, for example, $Ti_2N$, $Ti_3N_2$, $Ti_4N_3$, $Zr_2N$, $V_2N$ or $Cr_2N$.

Further, the metal sulfide may comprise, for example, $MOS_2$, $MOS_2$, $WS_2$, $ReS_2$, $NbS_2$, $ZrS_2$, $TiS_2$, $HfS_2$ or $VS_2$.

Further, the metal selenide may comprise, for example, $MoSe_2$, $WSe_2$, $ReSe_2$, $NbSe_2$, $ZrSe_2$, $TiSe_2$, $HfSe_2$ or $VSe_2$.

Further, the metal telluride may comprise, for example, $MoTe_2$, $WTe_2$, $ReTe_2$, $NbTe_2$, $ZrTe_2$, $TiTe_2$, $HfTe_2$ or $VTe_2$.

The active layer 400 may use a two-dimensional material. For example, the active layer 400 may comprise a two-dimensional material, $MoS_2$. Here, $MoS_2$ is a two-dimensional material and has excellent charge storage capability.

The active layer 400 may have an ultra-thin film structure. For example, the active layer 400 may be a $MoS_2$ ultra-thin film layer.

The active layer 400 has a resistance and capacitance varying with the applied voltage.

For example, the resistance and capacitance of the active layer 400 can be modulated by a change in the charge stored by $MoS_2$, used as the active layer 400, depending on the applied voltage.

The detailed switching mechanism thereof will be described later with reference to FIG. 2 to FIG. 4.

The second insulating layer 500 may be disposed on the active layer 400. The second insulating layer 500 may be made of any insulator material. For example, the second insulating layer 500 may comprise an organic material. The organic material may comprise, for example, poly methyl methacrylate (PMMA) or poly vinyl pyrrolidone (PVP) as an insulator material.

The second electrode 600 may be disposed on the second insulating layer 500. The second electrode 600 may be made of any electrode material. For example, the second electrode 600 may be an Al electrode.

Figure 2:
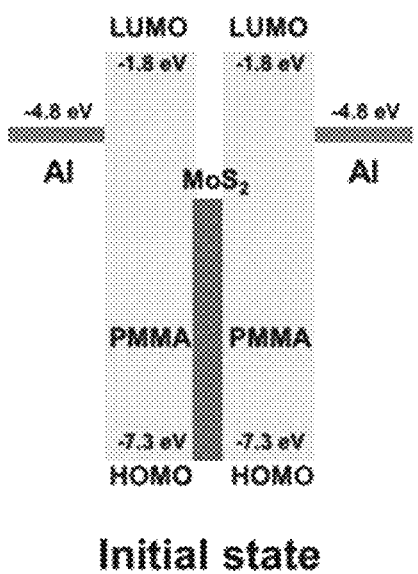
FIG. 2 to FIG. 4 are band gap diagrams illustrating the switching mechanism of a multi-function electronic device having a memristor and a memcapacitor according to one embodiment of the present invention.
Figure 3:
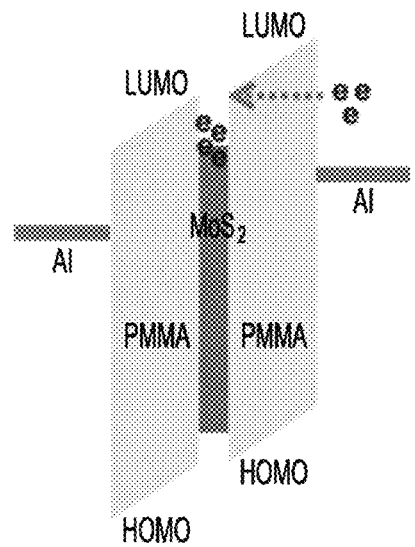
Figure 4:
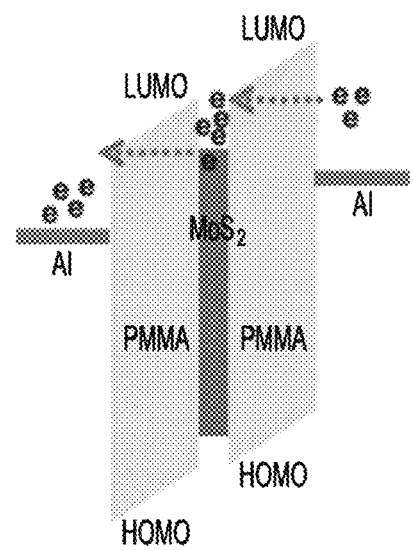

FIG. 2 to FIG. 4 are band gap diagrams illustrating the switching mechanism of a multi-function electronic device having a memristor and a memcapacitor according to one embodiment of the present invention.

FIG. 2 to FIG. 4 show as an example a multi-function electronic device having a memristor and a memcapacitor and which has a structure of Al electrode/PMMA layer/ $MoS_2$ layer/PMMA layer/Al electrode.

The resistance and capacitance of the multi-function electronic device having a memristor and a memcapacitor and which has a structure of Al electrode/PMMA layer/ $MoS_2$ layer/PMMA layer/Al electrode are modulated by the charge stored in $MoS_2$ used as the active layer.

Specifically, when a negative voltage is applied to the device, a band-bending phenomenon occurs at the PMMA/ $MoS_2$ interface, and the charge injected through the Al electrode is transferred to the $MoS_2$ thin film due to a tunneling phenomenon and stored in the trap site of $MoS_2$.

When a negative voltage with a magnitude larger than $V_{set}$ ($-V<-V_{set}$) is applied, charges are stored in all of the trap sites of $MoS_2$, and thus the charges injected through the Al electrode can freely move based on the trap-free space-charge limited current (SCLC) theory, resulting in a low resistance state (set). In this case, the amount of charges stored in $MoS_2$ increases, and as a result, the amount of charges of the entire device increases, resulting in a high capacitance state.

On the contrary, when a positive voltage is applied to the device, the charges stored in the trap sites of $MoS_2$ are detrapped. When a positive voltage with a magnitude larger than $V_{reset}$ is applied ($V>V_{reset}$), $MoS_2$ serves as a trap site of charges and thus interrupts the current flow, resulting in a high resistance state (reset). In addition, the amount of charges stored in $MoS_2$ decreases, and as a result, the amount of charges of the entire device decreases, resulting in a low capacitance state.

FIG. 2 is a band gap diagram illustrating the energy levels of the initial state of a multi-function electronic device having a memristor and a memcapacitor and which has a structure of Al electrode/PMMA layer/$MoS_2$ layer/PMMA layer/Al electrode.

With reference to FIG. 3, when the magnitude of the applied negative voltage V is smaller than the magnitude of $V_{set}$, charges are stored in the trap sites of the $MoS_2$ layer. Because part of the charges are stored in $MoS_2$, the multi-function electronic device having a memristor and a memcapacitor has a lower resistance and a higher capacitance than the initial state.

With reference to FIG. 4, when the magnitude of the applied negative voltage V gradually increases and becomes larger than the magnitude of $V_{set}$, charges are stored in all the trap sites of $MoS_2$, and thus the charges injected through the Al electrode can move freely, resulting in a low resistance state (LRS). Also, the amount of charges stored in $MoS_2$ increases, resulting in a high capacitance state (HCS).

On the contrary, when the magnitude of the applied positive voltage is larger than or equal to the magnitude of $V_{reset}$, the charges stored in the $MoS_2$ layer is detrapped. As a result, $MoS_2$ serves as a trap site of charges and thus interrupts the current flow, resulting in a high resistance state (reset). In addition, the amount of charges stored in $MoS_2$ decreases, resulting in a low capacitance state (LCS).

A method for manufacturing a multi-function electronic device having a memristor and a memcapacitor according to another embodiment of the present invention will be described below.

A method for manufacturing a multi-function electronic device having a memristor and a memcapacitor according to one embodiment of the present invention comprises the steps of: sequentially forming an active layer and a second insulating layer comprising an organic material on a first base material; removing the first base material; sequentially forming a first electrode and a first insulating layer comprising an organic material on a substrate; disposing the active layer and the second insulating layer such that the active layer is disposed on the first insulating layer, and forming a second electrode on the second insulating layer.

First, an active layer and a second insulating layer comprising an organic material may be sequentially formed on a first base material.

For example, the first base material may be a $Si/SiO_2$ base material substrate. Further, the active layer may have an ultra-thin film structure.

For example, the active layer may be grown on the first base material by chemical vapor deposition (CVD). Then, an organic material which is an insulator may be applied on the active layer to form a second insulating layer.

Then, the first base metal is removed. The first base material may be removed by conventional methods such as an etching process.

Meanwhile, a first electrode and a first insulating layer comprising an organic material may be sequentially formed on a substrate.

First, a first electrode may be formed on a substrate. For example, the first electrode may be formed by sputtering, RF sputtering, RF magnetron sputtering, pulsed laser deposition (PLD), chemical vapor deposition (CVD), plasma enhanced chemical vapor deposition (PECVD), atomic layer deposition (ALD), or molecular beam epitaxy (MBE). For example, an Al electrode may be formed on a $Si/SiO_2$ substrate by sputtering.

Then, an organic material may be applied on the first electrode to form a first insulating layer. Thus, a structure can be formed in which the first electrode and the first insulating layer are sequentially laminated on the substrate.

Then, the active layer and the second insulating layer may be transferred such that that the active layer is disposed on the first insulating layer. Thus, a structure can be formed in which the first electrode, the first insulating layer, the active layer, and the second insulating layer are sequentially laminated on the substrate.

An example of the present invention uses PMMA, which is used as a transfer medium of a two-dimensional material, as the second insulating layer, and thus has an advantage that it does not require a transfer medium removal process. Thus, it does not involve deterioration of properties due to a transfer medium remaining in a two-dimensional material after a transfer process.

Then, a second electrode may be formed on the second insulating layer. For example, the second electrode may be formed by sputtering, RF sputtering, RF magnetron sputtering, pulsed laser deposition, chemical vapor deposition, plasma enhanced chemical vapor deposition, atomic layer deposition, or molecular beam epitaxy deposition. For example, an Al electrode may be formed on a PMMA insulating layer by sputtering.

Thus, a multi-function electronic device which implements the functions of a memristor and a memcapacitor simultaneously, and which is a two-channel device having two electrodes can be manufactured.

Production Example 1

A multi-function electronic device having a memristor and a memcapacitor according to one embodiment of the present invention was manufactured.

Figure 5:
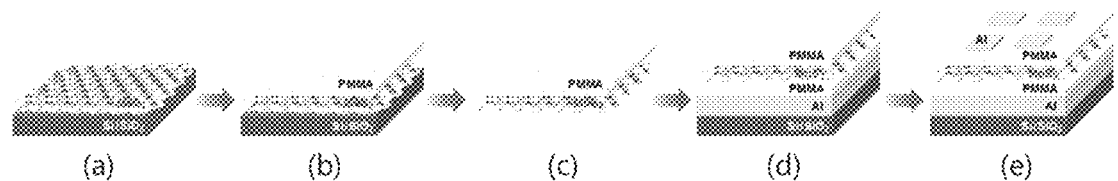
FIG. 5 is a schematic view illustrating the steps of a method for manufacturing a multi-function electronic device having a memristor and a memcapacitor according to one embodiment of the present invention.

FIG. 5 is a schematic view illustrating the steps of a method for manufacturing a multi-function electronic device having a memristor and a memcapacitor according to one embodiment of the present invention.

With reference to FIG. 5, a $MoS_2$ monolayer having a large area was synthesized on a $Si/SiO_2$ base material having a structure comprising a Si layer and a $SiO_2$ layer disposed on the Si layer, by chemical vapor deposition. Then, PMMA as an insulator was applied on the $MoS_2$ monolayer. The $Si/SiO_2$ base material was then removed.

Then, an Al lower electrode was formed on a $Si/SiO_2$ substrate, and then PMMA as an insulator was applied on the Al lower electrode.

Then, a $MoS_2$/PMMA layer was transferred on top of the substrate/Al/PMMA such that the $MoS_2$ layer of the $MoS_2$/PMMA layer from which the $Si/SiO_2$ base material was removed was disposed on the substrate/Al/PMMA, to form a laminated structure of the substrate/Al/PMMA/$MoS_2$/PMMA.

Finally, an Al upper electrode was deposited on the laminated structure of the substrate/Al/PMMA/$MoS_2$/PMMA to manufacture a multi-function electronic device having a memristor and a memcapacitor and which has a structure of the substrate/Al electrode/PMMA layer/$MoS_2$ layer/PMMA layer/Al electrode.

Test Example

Voltage was applied to the upper electrode of the multi-function electronic device having a memristor and a memcapacitor and which has a structure of Al electrode/PMMA layer/$MoS_2$ layer/PMMA layer/Al electrode manufactured according to Production Example 1, with the lower electrode grounded, and changes in the resistance and capacitance of the device was determined.

Figure 6:
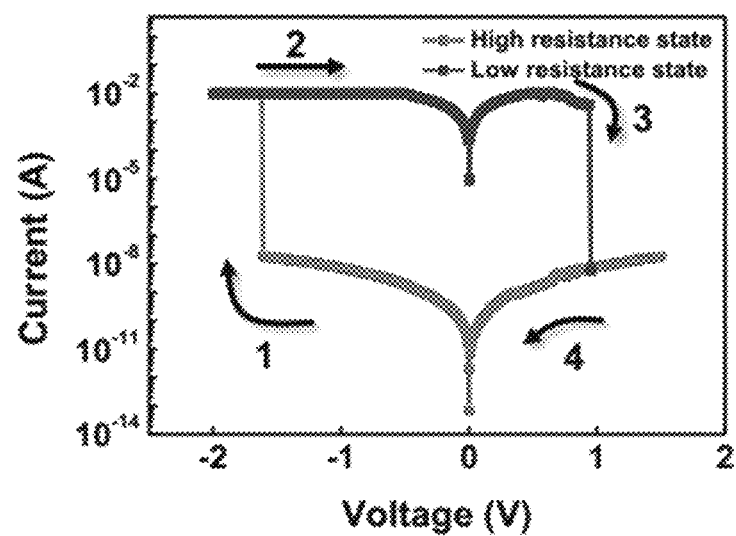
FIG. 6 is a graph showing the I-V characteristics of the multi-function electronic device having a memristor and a memcapacitor according to Production Example 1.

FIG. 6 is a graph showing the I-V characteristics of the multi-function electronic device having a memristor and a memcapacitor according to Production Example 1.

With reference to FIG. 6, when a negative voltage was applied to the upper electrode, a set operation, in which the current sharply increases at −1.8 V, occurred, and a high current state was maintained even when the voltage was removed to 0 V. On the contrary, when a positive voltage was applied, a reset operation, in which the current sharply decreases at 0.8 V, occurred, and a low current state was maintained even when the voltage was removed to 0 V.

Thus, it was confirmed that the device had memristor behaviors, in which the resistance state is modulated by voltage and the resistance state is maintained even when voltage is removed. It was found that the device had a resistance modulation ratio of $10^6$ or more and the operating voltage of ±1.8 V, showing that the device had excellent memristor operation characteristics.

Figure 7:
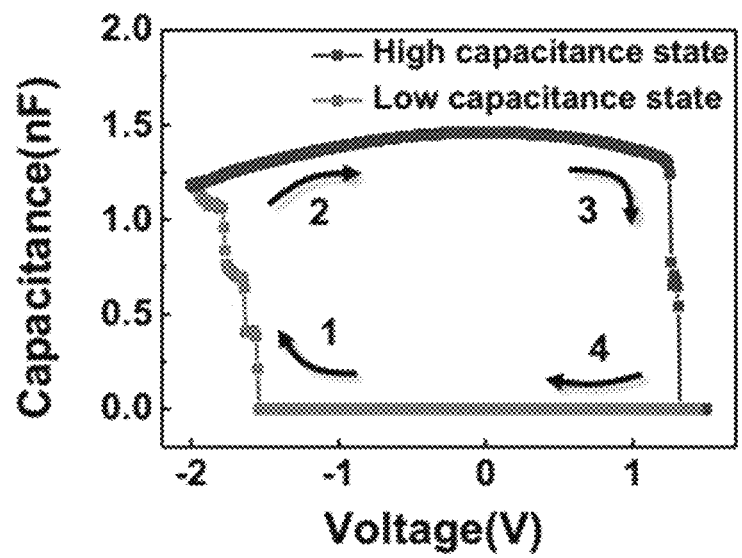
FIG. 7 is a graph showing the C-V characteristics of the multi-function electronic device having a memristor and a memcapacitor according to Production Example 1.

FIG. 7 is a graph showing the C-V characteristics of the multi-function electronic device having a memristor and a memcapacitor according to Production Example 1.

With reference to FIG. 7, the changes in capacitance with varying voltage show behaviors similar to the resistance change. When a negative voltage was applied, the capacitance sharply increased at −1.5 V, and a high capacitance state was maintained even when the voltage was removed to 0 V. On the contrary, when a positive voltage was applied, the capacitance sharply decreased at 1.2 V, and a low capacitance state was maintained even when the voltage was removed to 0 V.

It was confirmed that the device had memcapacitor behaviors, in which the capacitance is modulated by voltage and the capacitance value is maintained even when voltage is removed. The device exhibited two stable capacitances and exhibited a high capacitance ratio of $10^4$ or more, showing that the device had excellent memcapacitor operation characteristics.

Figure 8:
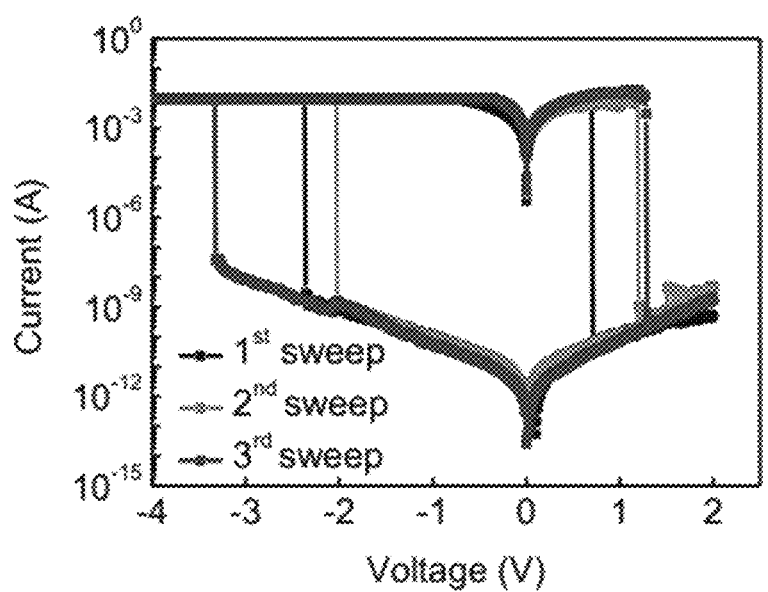
FIG. 8 and FIG. 9 are graphs showing the stability of the memristor device of the multi-function electronic device having a memristor and a memcapacitor according to Production Example 1.
Figure 9:
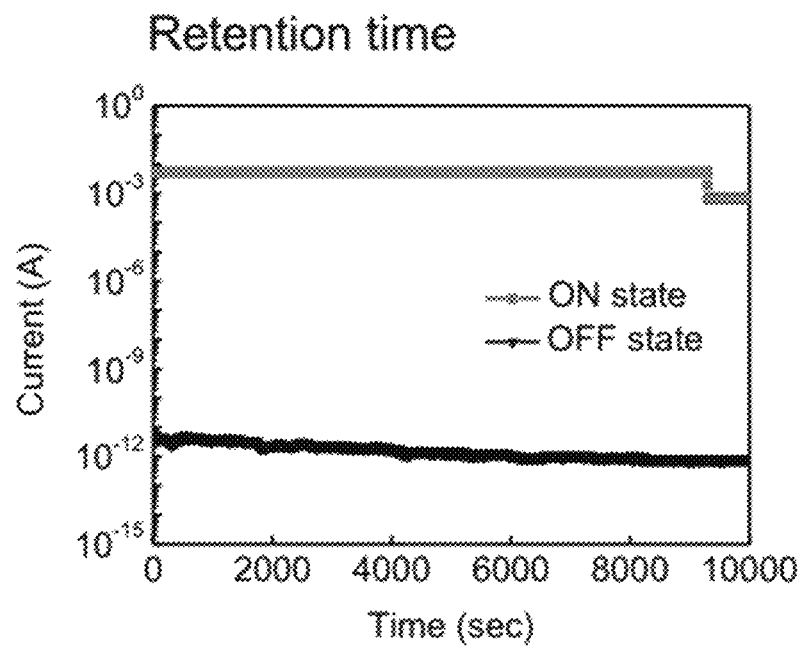

FIG. 8 and FIG. 9 are graphs showing the memristor device stability of the multi-function electronic device having a memristor and a memcapacitor according to Production Example 1.

FIG. 8 shows that, in the evaluation of the sweep endurance for the repeated operations of resistance modulation, the device performed a stable switching operation even in repeated operations.

FIG. 9 shows that, in the evaluation of the retention time of resistance, the device maintained a low resistance state (OFF state) and a high resistance state (On state), even after 10000 sec.

Figure 10:
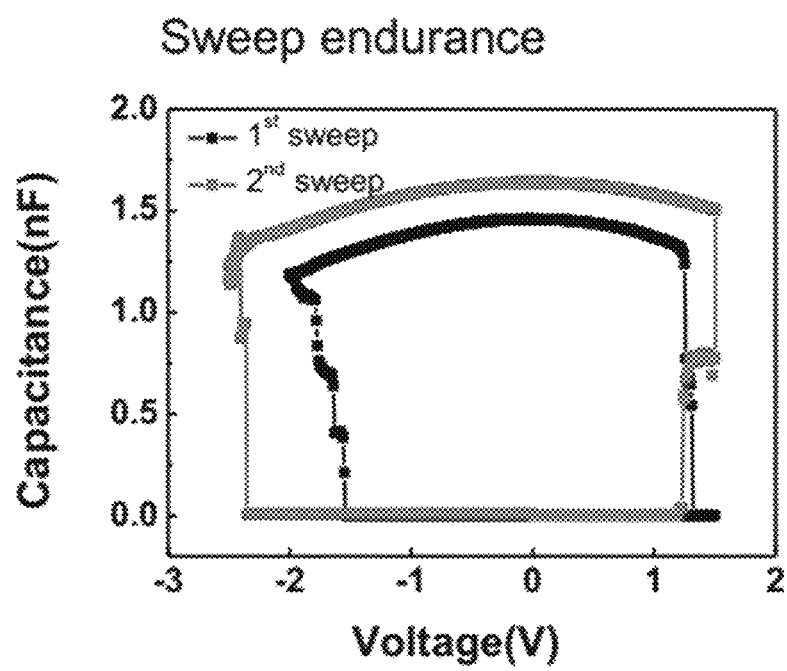
FIG. 10 and FIG. 11 are graphs showing the stability of the memcapacitor device of the multi-function electronic device having a memristor and a memcapacitor according to Production Example 1.
Figure 11:
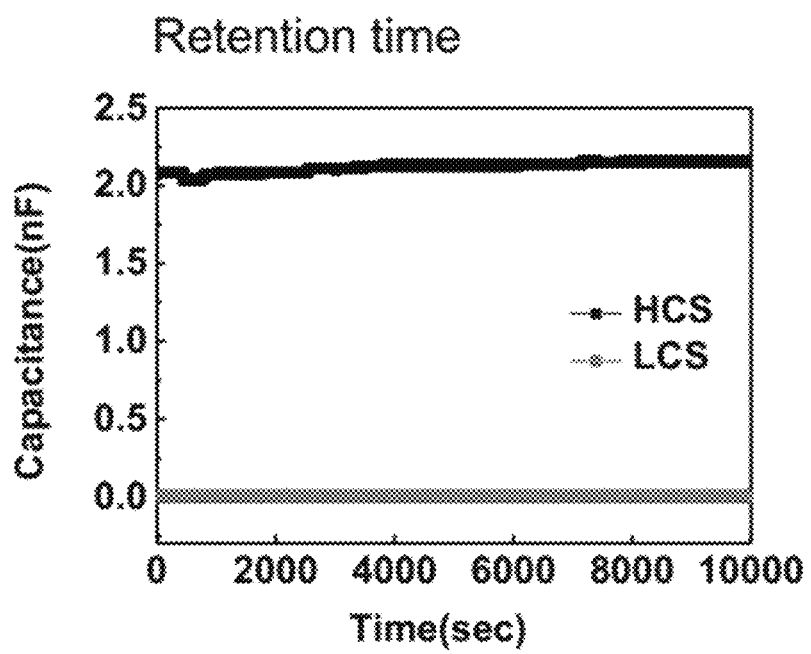

FIG. 10 and FIG. 11 are graphs showing the memcapacitor device stability of the multi-function electronic device having a memristor and a memcapacitor according to Production Example 1.

FIG. 10 shows that, in the evaluation of the sweep endurance for the repeated operations of capacitance modulation, the device performed a stable switching operation even in repeated operations.

FIG. 11 shows that in the evaluation of the retention time of capacitance, the device maintained a low capacitance state (LCS) and a high capacitance state (HCS), even after 10000 sec.

The present invention enables to simultaneously implement a memristor operation and a memcapacitor operation with a single material, thus allowing to substitute the resistance and capacitor constituting an electronic circuit with a single material. In other words, it allows to substitute a component that requires a variety of resistance and capacitance values with a single material. This allows to simplify the process of constructing an electronic circuit, resulting in reduced process costs.

In addition, a memristor and a memcapacitor allow the double modulation of resistance and capacitance values, thus enabling to embody a calculation device and a memory device in a single device. Therefore, it allows to efficiently increase the information processing amount per unit area, and to drastically reduce the calculation speed and power consumption.

Furthermore, the present invention can be used in both neuromorphic systems and mem-computing systems and can be applied to multiple-valued logic devices. Thus, it can be applied to most of the next generation semiconductor devices.

It is to be understood that the effects of the present invention are not limited to the above-described effects, but include all effects that can be deduced from the detailed description of the present invention or the constitution of the invention described in the claims.

It will be understood by a person skilled in the art that the embodiments of the invention described herein are for illustrative purposes only, and that various changes may be made therein without departing from the spirit of the present invention or modifying the essential features of the present invention. It is therefore to be understood that the above-described embodiments are illustrative in all aspects and not restrictive. For example, each component described to be of a single type can be implemented in a distributed manner. Likewise, components described to be distributed can be implemented in a combined manner.

The scope of the present invention is defined by the appended claims, and all changes or modifications derived from the meaning and scope of the claims and their equivalents should be construed as being included within the scope of the present invention.

REFERENCE SIGNS LIST

100: substrate
200: first electrode
300: first insulating layer
400: active layer
500: second insulating layer
600: second electrode

What is claimed is:

1. A multi-function electronic device having a memristor and a memcapacitor, comprising:
   a substrate;
   a first electrode disposed on the substrate;
   a first insulating layer disposed on the first electrode and which comprises an organic material;
   an active layer disposed on the first insulating layer;
   a second insulating layer disposed on the active layer and which comprises an organic material; and
   a second electrode disposed on the second insulating layer,
   wherein the active layer has a resistance and capacitance varying with the applied voltage,
   wherein the active layer comprises graphene, a metal oxide, a metal nitride, a metal selenide, or a metal telluride,
   wherein the graphene comprises monolayer graphene, bilayer graphene, multilayer graphene, or doped graphene,
   wherein the metal oxide comprises CaO, CdO, $Co_3O_4$, $CoO_2$, $CuO_2$, $MoO_3$, $WO_3$, $Ga_2O_3$, $MnO_2$, ZnO, $RuO_2$, $TiO_2$, $SnO_2$, $Nb_2O_5$, NiO, $CrO_2$, $Fe_3O_4$, $ZrO_2$, $HfO_2$ or $V_2O_5$,
   wherein the metal nitride comprises $Ti_2N$, $Ti_3N_2$, $Ti_4N_3$, $Zr_2N$, $V_2N$ or $Cr_2N$, wherein the metal selenide comprises $MoSe_2$, $WSe_2$, $ReSe_2$, $NbSe_2$, $ZrSe_2$, $HfSe_2$ or $VSe_2$,
   wherein the metal telluride comprises $MoTe_2$, $WTe_2$, $ReTe_2$, $NbTe_2$, $ZrTe_2$, $HfTe_2$ or $VTe_2$.

2. The multi-function electronic device having a memristor and a memcapacitor according to claim 1,
   wherein the first insulating layer and the second insulating layer each independently comprise a PMMA or PVA material.

3. The multi-function electronic device having a memristor and a memcapacitor according to claim 1,
   wherein the active layer has an ultra-thin film structure.

* * * * *